POSITIVELY-ACTING DIAZO PLANOGRAPHIC PRINTING PLATE
Filed Jan. 4, 1957
FIGURE I
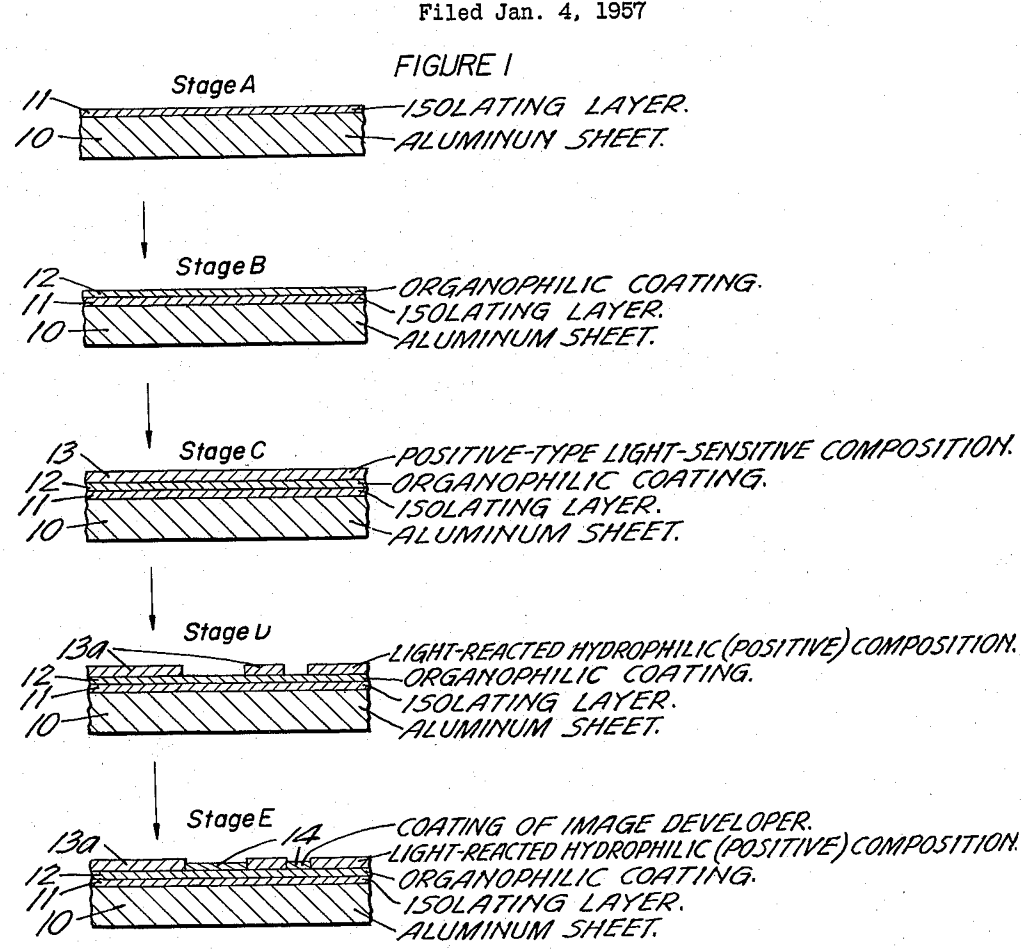
FIGURE 2
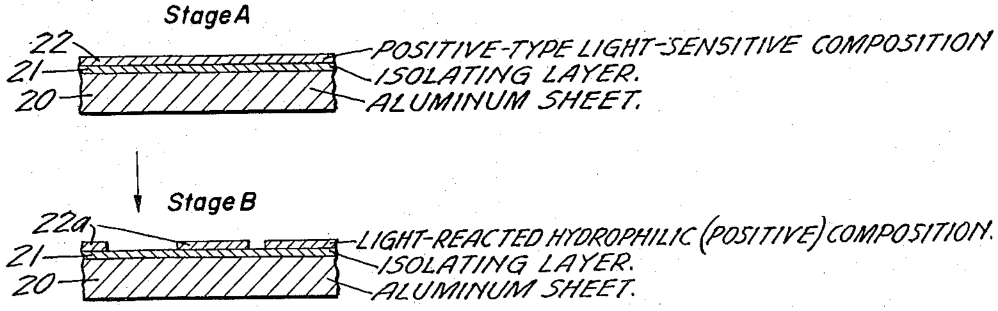
INVENTOR
JOHN M. CASE
BY
Carpenter, Abbott, Coulter, & Kinney
ATTORNEYS

United States Patent Office 3,085,008
Patented Apr. 9, 1963

3,085,008

POSITIVELY-ACTING DIAZO PLANOGRAPHIC PRINTING PLATE

John M. Case, Mounds View Township, Ramsey County, Minn., assignor to Minnesota Mining and Manufacturing Company, St. Paul, Minn., a corporation of Delaware Filed Jan. 4, 1957, Ser. No. 632,597
7 Claims. (Cl. 96—75)

The present invention relates to positively-acting planographic printing plates, by which is meant that positive images can be printed from such plates after they have been exposed through a positive transparency. It particularly concerns plates of a type which, upon a single exposure through a positive transparency can be used as a positive printing plate on well-known commercial forms of lithographic presses.

In the recent past, and for the first time to my knowledge, a dimensionally stable presensitized negatively-acting lithographic plate has been made in the manner described and illustrated in the application of Clifford L. Jewett and John M. Case, Serial No. 450,149, filed August 16, 1954, copending herewith, which application is a continuation-in-part of the Jewett and Case application Serial No. 199,566, filed December 6, 1950, now abandoned. The negatively-acting planographic plates there described have been sold commercially on an extensive scale. A more specific dimensionally stable presensitized negatively-acting lithographic plate has been made in the manner described and illustrated in the application of John F. Dowdall and John M. Case, Serial No. 523,951, filed July 25, 1955, also copending herewith. The present invention is in the nature of an improvement over, and a further development of the said inventions of Jewett and Case and Dowdall and Case.

My invention is particularly concerned with a positively acting presensitized dimensionally stable planographic printing plate capable of storage for long periods prior to use, in which the light-reactive component is a positive-type light-sensitive composition, i.e., upon exposure to ultraviolet light it becomes insolubilized and hydrophilic (selectively water-receptive and ink-repellant), and wherein only a single exposure is necessary in the development of the plate.

Insofar as I am aware, no one, prior to my invention, has ever produced any commercially acceptable presensitized positively-acting metal-backed planographic plate. Moreover, to the best of my knowledge, no one has produced a positively-acting presensitized lithographic plate of any sort which, upon a single exposure, followed by a single simple washing step provides permanently hydrophilic non-image areas which define the image area. I am aware that suggestion has been made to the coating of a light-sensitive resin on a non-metallic foil having a hydrated surface in contact with said resin. Over the light-sensitive resin is coated a water-soluble hydrophilic colloidal solution, e.g., gum arabic. Upon exposure of the coated foil through a positive, the exposed resin reacts, apparently trapping at the surface thereof some small amount of the overlying water-soluble layer such that upon subsequent washing of the plate all of the water-soluble layer is not removed from the exposed areas. The said exposed areas are thereby rendered somewhat hydrophilic in nature. In the unexposed areas the overlying water-soluble layer is completely removed by the washing along with most, but not quite all of the resin. Some amount of the light-sensitive resin apparently is bonded to and/or retained by the hydrated surface of the foil. Upon re-exposure of the whole plate to light, the slight amount of unreacted resin remaining in the unexposed areas after the washing step is insolubilized to an organophilic nature. The foil just described is disclosed in United States Patent No. 2,667,415, granted on January 26, 1954, to Neugebauer et al. on application filed January 13, 1949. It will be seen that a plurality of exposures is necessary to render this foil suitable for any kind of printing. This is inconvenient to the press operator who is to expose, develop and use the foil.

Further, press life of this construction is not long due to the fact that the image and non-image areas of the foil are organophilic and hydrophilic only at the extreme surface where the retention or entrapment occurs, the areas underlying these being hydrophilic and organophilic, respectively. Thus, loss of image is apt to occur, and/or scumming is apt to occur in the background or non-image areas. Particularly the non-image or background areas, which generally constitute a great majority of the plate surface, are apt to scum at least somewhat relatively rapidly. The plate then becomes essentially useless for high quality printing even if the scummed area is small.

Another type of prior art positively-acting plate is described in Neugebauer Patent No. 2,687,958, granted on August 31, 1954, on application filed May 10, 1950. An aluminum plate is coated with a light-sensitive resin which, upon exposure to light, insolubilizes to a hydrophobic or ink-receptive nature. After exposure of the plate through a positive, the water-soluble unexposed image portions are washed away and subsequently etched according to procedures known to the art. The reacted portions of the resin are then scrubbed away as "resist" to expose the underlying metallic surface. The disadvantages of coating the light-sensitive resin directly on the metal surface and employing the metal surface as the non-image area when such plates are employed in commercial practice, where printing of high quality is desired, will be apparent upon reference to United States Patent No. 2,714,066, granted to Clifford L. Jewett and John M. Case on July 26, 1955, which patent is a division of the aforesaid application Serial No. 450,149 of Jewett and Case. In brief, the light-sensitive resin is quickly degraded or "poisioned" by action thereon by the metal. Further, the metal backing is ineffective as a permanently hydrophilic scum-preventing surface. Hence, the exposed surface of metal plates in the non-image areas tends to scum when on the press.

It is therefore an object of the present invention to provide positively-acting planographic plates which are presensitized, i.e., are ready for exposure through a positive transparency without further treatment, yet which are stable, i.e, can be stored for considerable periods of time in light-proof packages and still be successfully used. A further object of the present invention is to provide a presensitized positively-acting lithographic plate of high dimensional stability where accurate registration is required such, as example, as in multi-color work, where the same sheet is successively printed from several lithographic plates. Another object of the present invention is to provide a presensitized positively-acting dimensionally stable planographic plate wherein, upon exposure, the exposed portions of the plate are insolubilized to an adherently retained permanently hydrophilic scum-preventing character which need not be removed prior to use of the plate in printing operations. A further object is to provide a presensitized dimensionally stable planographic plate in which it is neither necessary nor desirable to remove the exposed insolubilized resin portions prior to use and in which but a single exposure to light is necessary.

In attaining these and other objects and advantages I provide in combination a thin smooth-surfaced metal sheet having overlying at least one surface thereof separating means. Said means include a water-insoluble isolating and bonding layer in contact with and firmly adhered to the metal surface, the said layer being of such character that it will cause an in situ insolubilized-light-reacted diazo material to bond firmly to the sheet while protecting the diazo material in the still light-reactive state from degradation by the metal prior to exposure. Preferably the characteristics of the isolating and bonding layer are substantially the same as that of a product formed by reacting an aqueous solution of a sodium silicate with the surface of the sheet. Overlying the protective image providing means and superposed over the isolating layer is an attached initially soluble light-sensitive sensitizer layer which is light-insolubilizing, i.e. upon exposure to ultraviolet light it becomes highly insoluble, which is light-bonding, i.e. upon exposure it firmly bonds to the underlying surface to which it is attached, and which is of positive-type, i.e. upon exposure it becomes hydrophilic (selectively water-receptive and ink-repellent). Upon exposure of the plate to ultraviolet light through a positive transparency, the exposed light-reacted portions of the composition become insolubilized, hydrophilic and firmly bonded to the underlying film or surface. In the unexposed areas the light-snsitive composition remains soluble and is readily washed away to bare the underlying surface, in which latter is provided the image areas of the plate. Preferably the sensitizer layer consists essentially of a combination of initially soluble light-sensitive means for rendering the layer light-insolubilizing and light-bonding and means for imparting hydrophilicity to the exposed layer. My invention will be understood more fully upon a comprehension of the description herein taken as a whole, including the accompanying drawing, in which:

FIGURE 1 shows one embodiment of my invention in broken-away edge view at various stages of its manufacture, exposure to light through a positive transparency and development of the image and further treatment preparatory to use thereof. Thus under stage A is shown a metal sheet 10, preferably of aluminum, having a thin protective water-insoluble isolating and bonding film 11 which is tightly and chemically bonded to one surface to the sheet 10. Under stage B is shown the structure at stage A to which has been added a thin coating 12 of a permanently organophilic layer overlying the said film 11 and firmly adhered thereto. Under stage C is shown the structure at stage B except that over the coating 12 and attached thereto has been applied an initially soluble positive-type light-insolubilizable and light-bonding sensitizer layer 13. Under stage D is shown the structure at stage C after exposure thereof to ultraviolet light through a positive transparency followed by a washing with water or standard gum arabic solution, leaving the permanently hydrophilic insolubilized non-image portions 13*a* in the light-struck areas and baring the underlying organophilic coating 12 in the image areas. Under stage E is shown the exposed plate at stage D after the image surface thereof has been wiped with an image developer to leave an extremely thin coating of image developer 14 in the image areas.

FIGURE 2 shows an alternative embodiment of the present invention in broken-away edge view at two stages. Under stage A is shown such alternative embodiment. Under stage B is shown the structure at stage A after the exposure thereof to ultraviolet light through a positive transparency followed by a washing with water or standard gum arabic solution.

All dimensions in the drawing are greatly exaggerated for clarity of illustration. The sheet 10, though being a foil having a thickness in the order of about .005 to .012 inch, is shown in broken-away edge view, with respect to its thickness as well as to its length, to illustrate the fact that the isolating treatments or layers 11 and 21 are really very thin compared with the metal sheets 10 and 20, respectively. In fact, the said treatments or layers are probably little more than a monomolecular layer.

The organophilic coating 12 is shown in the drawing as also being a very thin coating, as are the positive-type light-sensitive sensitizer layers 13 and 22 in FIGURE 1, stage C and FIGURE 2, stage A, respectively. However, it is not the intention in the drawing to illustrate whether either of these is equal to, greater than, or less than the thickness of the isolating treatments or layers. Nor is it intended that the drawing illustrate whether the positive-type light-sensitive coating 13 is equal to, greater than, or less than the thickness of the organophilic layer 12. Actually, the isolating layer is apparently considerably thinner than any of the other coatings. Further, although it appears that the image areas of the plate are in depressions of considerable depth between the non-image areas, such is not the case. The coatings on my plates are so extremely thin that the depth of any depression will be only very slight.

A preferred embodiment of my invention, illustrated in FIGURE 1 of the drawing, consists in providing on a surface of the metal sheet 10, e.g., an aluminum sheet, a thin water-insoluble isolating treatment or layer 11, probably often substantially of monomolecular thickness, of a water-insoluble material having characteristics substantially the same as the product formed from treatment of an aluminum metal surface with an aqueous alkali metal silicate solution. The aluminum plate may be from .005 to 0.012 inch in thickness, although this obviously depends upon the type of press on which the plate is to be employed and other factors, and these dimensions may be greatly varied as circumstances permit.

Over the exposed surface of the layer 11, I apply a thin coating of a water-insoluble permanently organophilic (that is, selectively water-repellant and ink-receptive) material 12. The organophilic coating is very strongly adhered to the underlying isolating and bonding layer 11, and is thereby adherently retained on the surface of the sheet 10. Over this permanently organophilic surface, I apply a thin preferably water-soluble positive-type light-insolubilizing and light-bonding sensitizer layer 13. A preferred such layer is obtained by coating the plate with a dilute aqueous solution of a large preponderance of an organic hydrophilic vinyl water-soluble film-forming polymer, e.g., polyacrylamide, and a very minor proportion of a light-sensitive diazo resin or equivalent, followed by a drying of the plate.

The resulting product, following drying, may be packaged in any convenient light-proof container, and shipped to the customer in a distant city or state. When the customer desires to use the plate, which may be many weeks, or even months, after the plate was manufactured and shipped to him, he will remove the plate from is package under subdued light, place it in contact with a positive transparency, then expose it to a source of ultraviolet light for a short period of time, e.g., from 1 to 5 minutes, depending upon the intensity of the ultraviolet light, and then wash the surface of the plate with water, whereupon the unexposed composition (that shielded by the opaque areas of the positive), which remains water-soluble, is cleanly washed off leaving the underlying organophilic layer bared in those areas to provide ink-receptive image areas. The portion of the light-sensitive coating 13*a* which was exposed to the ultraviolet light was thereby light-reacted, insolubilized and rendered hydrophilic (that is, selectively ink-repellant and water-receptive). During such exposure and insolubilization, the light-reacted material becomes very strongly bonded to the surface of the underlying organophilic film.

This plate is then ready to be placed on a lithographic press, without further treatment, and used in printing or reproducing the desired writings or images. However, before placing it on the lithographic press, it is advantageous to treat the printing surface of the plate with what, for want of a better term, might be referred to as an "image developer" 14, which adheres to the bared areas of the organophilic coating 12. The image developer may take various forms. One example is a pigmented resin emulsion which will adhere to the ink-receptive areas but will not adhere to the hydrophilic areas of the plate. A printer's developing ink can also be used as an image developer. An example of an image developer, which we have found to be particularly useful, is described in Myron W. Hall U.S. Patent No. 2,754,279, granted on July 10, 1956, on application Serial No. 239,841, filed August 1, 1951.

The image developer is of this practical importance: prior to the application of the image developer, the image is not visible. If a plate in that form is presented to the lithographer or printer, he cannot be sure whether he is putting the plate on the press correctly or whether he has it backwards. Additionally, in the absence of the visible image, the pressman would not know whether he had an exposed plate, unless this were denoted by some coding system or such like. In addition to making the image visible, so the pressman can see it, a good image developer also (*a*) helps the plate to ink up more readily when placed on the press, and (*b*) strengthens the image so that more copies can be run from a single plate, while still getting clear reproductions.

Having now described generally one embodiment of my novel positively-acting planographic plate, the same will be more specifically described with the aid of the following specific but non-limitative example.

*Example I*

Aluminum foil or sheet material of about .005 inch in thickness is first made ready for treatment. Since greasy lubricants are commonly used in aluminum mills during the rolling operation, it is first desirable to treat the aluminum foil or sheet so as to remove any greasy film, so that the surface exposed will be an aluminum surface. One method which has been found to be advantageous in cleaning the aluminum surface is to immerse the same in a 20 percent solution of trisodium phosphate for a sufficient time only to clean the aluminum, e.g., for a period of 5 minutes. The temperature of the solution may be controlled at approximately 160° F. Higher temperatures may be used with a corresponding reduction in the time of treatment, and lower temperatures may be used with a corresponding increase in the time of treatment; and other solution concentrations may be used, if desired. The cleaning or degreasing of the aluminum foil or sheet material in the manner outlined above will often develop black scum or residue on the surface of the aluminum (which probably consists primarily of oxides and hydroxides of alloyed metals) which must be either thoroughly wiped or washed away mechanically or dissolved in an acid solution such, for example, as concentrated nitric acid. If there is no scum, then there is nothing to clean away; but if there is a black scum, it has been found that nitric acid of about 70 percent concentration, employed at room temperatures, will clean the scum off of the surfaces of the aluminum foil or sheet material and leave it in good condition for the subsequent steps of our plate making operation. (Aluminum is passive to 70 percent nitric acid.) After treatment with the acid solution, the aluminum foil or sheet material is thoroughly rinsed with water to remove any residual acid.

To a cleaned surface of the aluminum is then applied an isolating or barrier layer. In this instance a preferred treatment with a 2–5 percent aqueous solution of sodium silicate is employed, the sodium silicate having a silica to soda ratio of 2.50–1. Such a sodium silicate is available under the brand name "Star." A preferred method of treating the aluminum foil or sheet material with the sodium silicate solution involves dipping a cleaned aluminum surface in the silicate solution maintained at temperatures of the order of 180°–212° F. This can conveniently be done by running a web of aluminum foil continuously through an immersion bath. At these temperatures the soluble silicate will react with the surface of the aluminum to form an insoluble hydrophilic silicious surface. After this treatment, the excess soluble silicate, and any other soluble materials present, are immediately thoroughly washed away, and the treated foil or sheet is dried. The resulting silicate treatment on the surface of the aluminum foil or sheet is extremely thin but is very abrasion resistant. It is also substantially free of water-soluble material. It appears to be chemically bonded to the aluminum and apparently can only be abraded away by penetrating the surface of the aluminum sheet.

The silicate treated aluminum foil or sheet just described is of quite a smooth character and usually has a metallic sheen or relatively smooth appearance. While some very slight amount of etching may unavoidably occur on the aluminum surface of the sheet during the cleaning operation, this is so small that it does not impart to the finished silicate treated sheet a rough surface or a matte appearance. This is important in securing the highest performance characteristics, sought after in my finished presensitized positively-acting lithographic plates, particularly where fine line work or fine half-tones are being reproduced.

To the silicate treated sheet is next applied a firmly bonded organophilic coating. A preferred application involves coating the silicate-treated surface with a solution of a light-sensitive diazo resin or equivalent material of such character that upon exposure to heat or ultraviolet light it becomes water-insoluble, organophilic and firmly bonded to the underlying isolating layer. One suitable method of making a suitable light-sensitive diazo resin is as follows: thirty-four parts by weight of the sulfate salt of para-diazodiphenyl amine is mixed with 3.25 parts of para-formaldehyde and 4.5 parts of anhydrous zinc chloride. The above mixture is gradually introduced into 135 parts of cool sulfuric acid of 66° Baumé, care being taken that the temperature does not exceed 6° C. When poured on twice its weight of ice, the brown solution (obtained from the above reaction) decomposes to a black tarry material, essentially an impure diazo resin, which is removed and dissolved in water. Addition of an excess of a saturated zinc chloride solution to this aqueous diazo resin solution precipitates a yellow solid which is removed; this yellow solid is then further purified by dissolving in water and precipitating by the addition of alcohol. This new precipitate is the purified light-sensitive diazo resin and, in the form of a dilute solution in water, for example, about a one percent solution, is applied to the silicate treated surface of the sheet.

The reactions and precipitations employed in the making of the light-sensitive diazo resin are carried out under subdued light, for example, under a yellow light. This is also true of the operation of coating the silicate surface of the aluminum sheet with a dilute solution of the light-sensitive diazo resin or equivalent.

The dilute solution of light-sensitive diazo resin, just described, may be applied to the exposed surface of the permanently hydrophilic silicate treated sheet, or equivalent, above described, by a roll coating method, for example. Running the sheet in pressure contact with a rotating rubber roller, which is wet with the dilute diazo solution, applies a thin continuous coating of the diazo solution over the surface. It is preferred that the diazo coating be an extremely thin one, for example, leaving a residue of about 0.003 gram, or even less, e.g., 0.001 gram, of the diazo per square foot of plate area.

When the thus applied diazo coating is dried, the sheet is then fully exposed over its entire surface with ultraviolet light. For example, the sheet may be exposed in the manner hereinafter indicated for the exposure of the resultant presensitized plate through a transparency. Upon exposure the diazo resin reacts, expelling nitrogen from the molecule, and becomes permanently organophilic, insolubilized and firmly adhered to the underlying insolubilized silicate isolating and bonding layer previously applied to the metal plate.

Following the exposure a coating of a positive-type light-sensitive composition is applied over the permanently organophilic surface of the sheet. A preferred composition consists of a mixture of about 1 part by weight of a light-sensitive diazo resin like that used in providing the organophilic coating as described above and about 20 parts by weight of an organic hydrophilic water-soluble film-forming vinyl polymer. In this instance, the vinyl polymer is polyacrylamide.

A highly suitable polyacrylamide, available under the trade designation "PAM-50," is a white amorphous solid (powder) at room temperature having an average molecular weight of about 400,000–500,000. A 2 percent water solution by weight of this polymer has a viscosity of about 18 cps. at 25° C. A very similar and equivalent polymer is prepared as follows: 80 parts of acrylamide monomer is dissolved in 720 parts of water at room temperature. A stream of inert gas such as nitrogen or carbon dioxide is bubbled through the solution for about one-half hour so as to remove substantially all of the oxygen content thereof. Then 0.04 part of potassium sulfate dissolved in approximately 5 parts of water are added to initiate polymerization. The mixture is vigorously stirred for about 3 hours and then allowed to settle for about 6 additional hours, the inert gas being bubbled through the reaction mixture during the entire time. As polymerization occurs the temperature of the reaction mixture will increase slightly. However, external cooling of the reaction vessel ordinarily is unnecessary. The resulting polymerized product mixture, containing about 10 percent solids, is of a gelatinous nature. Solution is easily effected upon dilution with water.

A dilute, e.g., preferably about one percent solids by weight, coating solution is then prepared by mixing or stirring together a portion containing 20 parts solids of the previously obtained or prepared water solution of polyacrylamide and a water solution of the diazo resin containing one part solids by weight. The resulting combined solution can then be further diluted as necessary to obtain the desired coating solution concentration. Although in the present example a preferred weight ratio of polyacrylamide to diazo resin is shown, viz. 20:1, respectively, the permissive range is quite broad, extending from about 8:1 to about 300:1.

Under subdued light conditions, the resulting solution of positive-type sensitizer composition is then applied to the previously coated organophilic surface by roll coating, as above described in connection with the application of the organophilic diazo resin layer. Preferably, here also, the coating is a thin one, leaving a residue of approximately 0.003–.015 gram, or less, of the resin composition per square foot of plate area. In continuous coating operations the coated web is taken away from the coating mechanism and dried with the web disposed horizontally, coated side up. I have found that in this manner uniformity of coating is promoted.

After the coating is dried, still under subdued light, the treated and sensitized sheet is then die cut to standard plate sizes and then packaged in light-proof packages, in which they are shipped in commerce to users and customers. They are stable, that is, they may be stored for long periods, for example several weeks or months, while still remaining highly suitable.

The customer, in employing my novel positively-reacting plates, removes them from the package under subdued light and places a positive transparency thereover. The plates are then exposed through the transparency and processed all as will now be described to produce the desired image.

Exposure of my positively-acting presensitized lithographic plates may be carried out in a very short time in a printing frame under a source of ultraviolet light. Carbon arcs may be used but are not required. Photoflood bulbs and "black light" fluorescent tubes will also give satisfactory results. While the exposure time is not critical, extreme over-exposure may result in broken images or no image at all. On the other hand, extreme under-exposure may cause dirty highlights and blocked-up shadows in half-tone areas. While the users of our presensitized plates have considerable latitude in the amount of exposure, the foregoing will serve to guide him from undue extremes of over-exposure or under-exposure.

Suggested exposure times for the following light sources are:

| | Minutes |
|---|---|
| Bank of 15 watt BL light tubes at 6" | 2–4 |
| 35 amp. carbon arc at 24" | 1–2 |

After exposure, the plate is desensitized by wiping with water, which dissolves and removes the unreacted sensitizer. At this point the image is invisible. Preferably, though not necessarily, an image developer or strengthener consisting of a resin emulsion (or, alternatively, a printer's developing ink of conventional type) is poured on the plate while the latter is still wet and rubbed in quickly with a soft pad or cotton wad. The excess image developer should be wiped away before it dries completely. The resinous portion of the image developer preferably should contain a pigment or dye which will make the image clearly visible as the particles of resin adhere to the organophilic image. The plate is then ready for the press.

Scratches, fingerprints and other foreign matter will impair the plate surface, and it, therefore, should be handled carefully, by the edges. This is true particularly prior to exposure, and, also to a slight extent after exposure. Thus, if the plate is going to be stored for a period of time after exposure, a desirable precaution is to coat the non-image surface of the plate with a gum arabic solution, which gives mechanical protection thereto. The solution can easily be washed off with water when it is desired again to use the plate. However, the coating is only precautionary in nature—my plate may be left on the press or stored indefinitely after exposure without adverse effect.

After the plate has been installed on a lithographic press, the gum arabic coating (if previously applied) is removed by sponging with water or with a weak fountain solution. The fountain rollers should be dropped first and, after a few revolutions, the ink rollers may be dropped. The image should ink up quickly. No special inks or fountain solutions are required, and most materials commonly used for this purpose will be found to be satisfactory for use with my plates. In order to obtain the maximum number of satisfactory impressions, the press should be carefully adjusted to the least pressure consistent with quality printing.

The positively-acting lithographic plates of the present invention require very little water on the press. This is an important factor in giving more brilliancy in lithographic reproductions made from my plates since the reduction of color brilliancy caused by emulsification of water is greatly minimized where my plates are used. It also follows that where my plates are used, less ink is also required to give the same tone values in the finished work, and especially so in multicolored printing, thereby significantly reducing the drying time required between the printing of successive colors.

My lithographic plates are of such nature, due to the particular materials and the thickness thereof, that they do not wrinkle or stretch during processing or on the press (as do paper or plastic planographic plates, for example) and therefore are particularly suitable for lithographic printing, even where very accurate registration is required.

One advantageous type of aluminum foil to be used, in the manner above described, is one designated as "3003H19" the same containing about 1.25 percent manganese alloyed with the aluminum. There are some other types of aluminum foil or sheeting which would be too soft and pliable to be well suited for our use if employed in the form of relatively thin gauge sheets, although any commercial type of aluminum which is stiff enough to resist wrinkling and creasing, in the form of thin sheets or foil, may be employed.

While aluminum appears, at present time, to be my preferred metal backing sheet material, on the basis of cost, handling properties and such like, sheets of lithographic zinc, foils of copper, lead and tin, electro-deposited chromium and copper surfaces, sheets of commercially pure magnesium, polished sheets of tantalum and a sheet of titanium known as Ti–75A, all can be employed, the same being treated in the manner described in the example to provide an isolating and bonding film or surface to which the overlying organophilic coating and positive-type insoluble image will strongly adhere. Still other metals may be employed in making our presensitized planographic plates, so long as a strongly adherent isolating bonding film can be applied thereto, with suitable control of conditions, but I believe the amphoteric metals, as a class, provide the best surfaces on which to apply our protective image-retaining surface treatments.

While in the preceding example preferred sodium silicate solution was employed as the isolating layer, any suitable material which, when applied to aluminum forms a surface layer having characteristics substantially identical to that formed by the sodium silicate is likewise suitable. That is, any isolating and bonding material, i.e., which firmly adheres to the cleaned metal surface, to which the overlying organophilic coating firmly adheres and which protects the sensitizer layer from degradation by the metal can be used. With variations in metal sheets and/or with variations in the light-sensitive organic material to be employed and/or with variations in the treating procedure, other treating materials than the sodium silicate may be useful or even preferred. For example, any of the soluble silicate coatings on, or treatments of, the metal sheet disclosed in the aforementioned Jewett and Case Patent No. 2,714,066 can be employed equally well in the present invention when utilized in accordance with the teachings therein. Briefly some of these suitable soluble silicates include alkali metal silicate, calcium silicate, silicic acid, colloidal hydrated silica and polymerized silicic acid.

Also, any of the organic polyacid polymer treatments of the metal surface described as being suitable in the aforementioned Dowdall and Case application Serial No. 523,951 can be employed as the isolating layer in my structures with at least equivalent results when employed in accordance with the teachings of said application. For example, polyacrylic acid, homologues of polyacrylic acid, carboxymethyl cellulose, carboxymethyl hydroxyethyl cellulose, vinyl addition copolymers of maleic anhydride and methyl vinyl ether, and equivalents of these are highly suitable.

I have disclosed several types and examples of materials which suitably produce an effective in situ formed hydrophilic water-insoluble isolating and bonding surface or layer on the metal. Other materials than those disclosed herein having the desired properties and which are full equivalents of those disclosed will suggest themselves to men skilled in the art.

In the preceding example, the organophilic coating consisted of a light-reacted insolubilized diazo resin. Other organophilic coatings can also be employed which firmly bond to the underlying isolating and bonding layer and to which the positive-type light-reacted composition firmly adheres. Variations from light-reacted organophilic coatings are contemplated. However, light-sensitive materials, especially light-sensitive diazo resins, are preferred materials for the organophilic coating. The light-sensitive azide of the above-described diazo resin also can be employed with suitable modifications. This polymeric azido resin is not water-soluble and only slightly soluble in common organic solvents, but a concentration suitable for coating can be obtained using as solvents toluene or methyl cellosolve, or mixtures of these, or other organic solvents. Other light-sensitive resins, such as other polymeric aliphatic and aromatic azido resins, diazo oxides, monomolecular imino-quinone-diazide made from the preferred diazo monomer, and polyvinyl cinnamate, may be employed all as is more particularly described in the aforesaid Jewett and Case Patent No. 2,714,066, and thereafter light-exposed to an organophilic nature.

The positive-type light-sensitive composition utilized in the preceding example represents a preferred composition. Other initially soluble positive-type light-insolubilizing compositions which are also light-bonding, that is which upon exposure to ultraviolet light firmly adhere to the underlying layer, can be employed. I have, for example, used other compositions comprised of a large preponderance, e.g., ratios of greater than about 8:1 by weight, of a water-soluble strongly-hydrophilic vinyl-type polymer and a small proportion, e.g., ratios of less than about 1:8 by weight, of light-sensitive diazo or equivalent resin.

One positive-type light-sensitive composition, which has been used in making experimental plates which are stable and from which several thousand clear and accurate line-copy reproductions can be made, consists of a water solution prepared by mixing 80 parts of a one percent by weight water solution of the film-forming vinyl addition product of stoichiometric quantities of methylvinylether and maleic anhydride, 10 parts of a one percent by weight water solution of the above-described preferred diazo resin and 150 parts of methyl alcohol, the parts named being by volume. Solution of the several components, i.e., the alcohol, the diazo solution, and the copolymer solution, is easily achieved by simply stirring them together at room temperature. A copolymer of the nature of that used is the hot water-soluble powdered solid available under the trade name "PVM/MA." The solution can be applied over the underlying layer by merely quickly dipping the plate in solution followed by drying, e.g., about one minute at 150° F.

Although the ratio of copolymer to light-sensitive material can be varied within limits, and probably will differ where a different light-sensitive resin is used, the approximately 8:1 ratio of copolymer to the diazo has been a preferred one. At much less than this ratio scumming is apt to occur in the insolubilized light-reacted areas due to insufficient hydrophilicity. On the other hand, at ratios much greater than 8:1 press life of the exposed plate diminishes due apparently to reduced adhesion of the exposed hydrophilic layer to the underlying layer, and/or decreased insolubilization of the light-exposed composition. Preferably, when a plate employing this particular composition is used in lithographic printing a neutral or slightly alkaline fountain solution is used on the press (insufficient, however, to emulsify and ruin the ink). In this manner press life of the plate is lengthened.

Another positive-type sensitive composition which in some respects is preferable to the just mentioned diazo-copolymer composition is a coating derived from a coating solution composed of, by volume, 10 parts of a one percent by weight water solution of the preferred diazo resin above described, 20 parts of a 5.5 percent by weight water solution of high molecular weight polymethacrylic acid, 500 parts of methyl alcohol. Solution of the components is easily effected upon simple stirring. The plate is coated by dipping it quickly into the solution and drying, e.g., at 150° F. for about 1–2 minutes. A stable plate is produced which upon exposure through a positive transparency, and subsequent processing, is capable of reproducing several thousand high quality line copies. Preferably the fountain solution is kept neutral or slightly alkaline for optimum press life. Advantageously in this composition the ratio of polymethacrylic acid to diazo may be varied rather widely. For instance, the 11:1 ratio of polymer to diazo can be varied to as high as 20:1 and as low as about 8:1 while still retaining adequate adhesion and hydrophilicity, respectively, in the insolubilized areas. The polymethacrylic acid used can be prepared by homopolymerizing at 70° C. in 90 parts by weight of water, 10 parts of methacrylic acid monomer in the presence of 0.1 part of potassium persulfate. Polyacrylic acid and equivalent homologues thereof can also replace the polymethacrylic acid.

Where other light-sensitive resins are used in place of the diazo resin I prefer, the optimum ratio of initially water-soluble hydrophilic vinyl-type polymer and light-sensitive resin undoubtedly will vary somewhat from compositions where such diazo is used. Sufficient light-sensitive resin should be present in the composition to cause adhesion to the underlying layer and ostensible insolubilization of the entire coating upon exposure to light either by molecular entrapment or by some other mechanism. On the other hand sufficient of the hydrophilic polymer should be present so that the net character of the insolubilized composition entirely throughout is hydrophilic, that is selectively water receptive. Generally there is some latitude allowed within the range of optimum proportions. Where a proper balance is reached, many thousands of copies may be reproduced on a properly adjusted press before the background areas tend to commence scumming slightly through complete wearing away of insolubilized hydrophilic composition in the non-image areas of the plate. In the furtherance of production of stable plates which can be stored for long periods before use, the components of the light-sensitive positive-type compositions should be selected such that they may be stored in intimate association, e.g., in the sensitizer layer, for months or longer without degrading one another. That is, the light-sensitive resin should not destroy the hydrophilicity of the polymer; and the polymer should not destroy the light-sensitivity of the other.

Where the light-sensitive material employed is initially water-insoluble some alteration of procedure may be necessary. It may be that a common solvent for the two components can be used in which case a dilute thinly fluid solution is applied as before. Or a fine emulsion composed of the water-solution of the water-soluble polymer and of an organic solution of the light-sensitive material, either organic-in-water or water-in-organic, may be used. The end result is the same (so long as the system does not deleteriously affect the underlying layer) since the liquid vehicle is volatilized away before the plate is used thus leaving intimately mixed and associated the components of the positive-type light-sensitive composition. Where such components are employed in the positive light-sensitive composition some alteration in procedure may be necessary in washing the plate after exposure to remove unreacted material. The proper washing liquid to be used undoubtedly will usually be the same as or similar to the solvent or emulsion by which the sensitizer was applied to the plate.

The embodiments described hereinabove comprise a thin smooth-surfaced metal sheet having separating means including a thin protective isolating and bonding layer and an overlying organophilic layer interposed between the metal sheet and the initially soluble positive-type light-insolubilizing and light-bonding sensitizer layer. Thus, these positively-acting plates are exposed to ultraviolet light through a positive transparency, the light-sensitive resin portions in the non-image areas become insolubilized, firmly adhered to the underlying organophilic layer and permanently hydrophilic while the unexposed and, hence, still light-sensitive resin portions remain soluble. Upon being washed with water or fountain solution the unexposed resin in the image areas is washed away thereby exposing the underlying organophilic surface in these areas. While these constructions represent preferred embodiments of my invention, additional positively-acting presensitized lithographic plates come within its scope. One such alternative structure will be seen upon reference to FIGURE 2 of the drawing and to the following example.

*Example II*

In this embodiment a metal sheet 20, for instance an aluminum plate, is first cleaned in the manner hereinabove described in Example I. To a cleaned surface of the sheet 20 is then applied separating means consisting of an isolating and bonding layer 21. Over the latter is applied a positive-type light-sensitive composition 22. Each of the layer 21 and the coating 22 is applied in the manner described in connection with the applications of the isolating layer and positive-type light sensitive layer, respectively, in Example I hereof. After the last applied coating is dried, the treated and sensitized sheet is then die cut to the desired sizes, packaged in light-proof packages and shipped in commerce to users and customers.

The customer, then exposes the plate through a positive transparency, whereby the non-image areas are rendered permanently hydrophilic and insoluble. The unexposed portions in the image areas are then removed by swabbing or wiping the plate with water or gum arabic solution. Thus the insolubilized portions **22*a* remain and the underlying isolating layer 21** is left exposed in the image areas (FIGURE 2, stage B).

Thereafter, a somewhat different procdure than that employed in preceding examples is followed by the press operator in developing the permanently organophilic image area of the plate of the present example. A suitable etching solution, e.g., "Lith-Kem-Ko Copper Base" (an alcoholic cupric-chloride solution), is wiped over the surface of the plate. Etching occurs in the image areas, the underlying isolating and bonding film 21 and perhaps also the surface of the metal 20 being chemically attacked, with metallic copper being plated out. However, the insolubilized surface of the non-image areas remains substantially unaffected by the etching solution.

The plate is then wiped with methyl alcohol or equivalent to thereby remove any remaining alcohol soluble materials, for example, to remove unreacted cupric chloride and reaction by-products. Although the plate is then ready for the press, the image is preferably further strengthened by the application to the image areas of a nonblinding vinyl lacquer such as "Lith-Kem-Ko Deep Etch 'C'" lacquer. This is accomplished by spreading the lacquer evenly over the entire surface of the plate followed by wiping the plate dry. The dried lacquer film adheres firmly to the copperized image areas but does not firmly adhere to the hydrophilic non-image areas and is easily removed from the latter areas by simply soaking of the plate in water for a few minutes and wiping dry. The plate is then mounted on a lithographic press and used in printing operations as above described.

The positively acting planographic plate of the present example is highly satisfactory. Where the proper selection of the isolating layer and the positive-type light-sensitive composition are made several thousands, often in the order of 25–30,000, of faithful reproductions can be made from a single plate. The plate is, however, somewhat less convenient to handle from the point of view of the press operator than the embodiment of Example I wherein the procesdures for readying the plate for the press after exposure are somewhat less involved. Nonetheless, only a single exposure is necessary. Only a simple washing step is necessary after exposure to provide directly the permanent non-image areas of the plate. In these regards the plate of the present example is highly advantageous and a significant improvement over the prior art.

The proper selection of the isolating and bonding layer and the positive-type light-sensitive composition is governed similarly as in the case of the plate of Example I. The isolating and bonding layer is of such character that it will protect the positive-type light-sensitive composition from degradation prior to exposure of the plate and will provide a surface to which the light-reacted resin will firmly adhere upon exposure. Any of the materials specifically named in Example I as providing suitable isolating layers are equally suitable for use in the present embodiment. Other equivalent materials can also be used. Likewise, any positive-type light-sensitive composition which can be employed in my preferred embodiment can be used in the structure of the present example, the considerations and limitations being, insofar as I know, about the same.

It is noted that other procedures than the etch procedures described can be used by the operator to render the image areas of the plate of the present example organophilic after exposure and washing. He may, for instance, apply to the plate after it is exposed, washed with water and dried, and thus at the stage depicted in FIGURE 2, stage B, any of varous organophilic silicone solutions or compositions. An example of such a solution is a heptane solution of an alkyl silicon halide. The applied silicon, upon being applied over the plate and dried, adheres firmly to the underlying isolating layer which is exposed in the image areas. It does not adhere to the insolubilized light-reacted hydrophilic areas. The non-image areas are thus readily wiped clean in preparing the plate for the press.

While we have described our novel positively acting plates primarily in connection with their use as lithographic plates, they have other uses. For example, our plates can be used to advantage in the photographic preparation of permanent metal name plates, instruction panels, templates, wiring diagrams, dial and scale faces, advertising specialties, signs, maps and the like. For these purposes, the plate is exposed to ultraviolet light through a positive transparency, followed by desensitizing and inking or developing as described above. After the developed plate with its visible image has been washed and dried, it may be used as such, or the surface may be further protected by spraying with a clear lacquer. Such plates may be fastened to machinery, and used to identify its parts, its manufacture, etc. If desired an adhesive, e.g., a pressure-sensitive adhesive, may be applied to the back surface of the label whereby the plate or label is held in place.

Hereinabove we have attempted to describe and illustrate our invention in various details, and not to limit it. All modifications and variations which are novel over the prior art and within the scope of the appended claims are contemplated.

What I claim is:

1. A stable presensitized positively-acting dimensionally-stable planographic plate capable, upon a single exposure through a positive transparency followed by a simple washing step, of directly providing insoluble hydrophilic surface areas which permanently define or outline the image areas corresponding to the opaque areas of said transparency, said plate comprising an aluminum sheet having a water-insoluble hydrophilic isolating and bonding surface layer formed by reacting an aqueous solution of a soluble silicate with the surface of said sheet, said layer overlying and being firmly bonded to said sheet and being substantially free of water-soluble material, an in situ insolubilized light-reacted organophilic coating overlying and firmly anchored to said isolating and bonding layer, and a soluble sensitizer layer overlying and adhered to said organophilic coating, said sensitizer layer being characterized in that, upon exposure to light through a transparency, it reacts in the exposed areas to provide an insoluble ink-repellent water-receptive surface corresponding with the light-transmissive areas of said transparency while remaining soluble and readily removable in the unexposed areas corresponding with the opaque areas of said transparency, said sensitizer layer comprising a water-soluble organic hydrophilic linear vinyl addition polymer intimately mixed throughout said layer with a water-soluble light sensitive diazo resin, the weight ratio of said vinyl polymer to said diazo resin being from about 8:1 to 20:1.

2. A stable presensitized positively-acting dimensionally-stable planographic plate capable, upon a single exposure though a positive transparency followed by a simple washing step, of directly providing insoluble hydrophilic surface areas which permanently define or outline the image areas corresponding to the opaque areas of said transparency, said plate comprising an aluminum sheet having a water-insoluble hydrophilic isolating and bonding surface layer formed by reacting an aqueous solution of a soluble silicate with the surface of said sheet, said layer overlying and being firmly bonded to said sheet and being substantially free of water-soluble material and a soluble sensitizer layer overlying and adhered to said isolating and bonding layer, said sensitizer layer being characterized in that, upon exposure to light through a transparency, it reacts in the exposed areas to provide an insoluble ink-repellent water-receptive surface corresponding with the light-transmissive areas of said transparency while remaining soluble and readily removable in the unexposed areas corresponding with the opaque areas of said transparency, said sensitizer layer comprising a water soluble organic hydrophilic linear vinyl addition polymer intimately mixed throughout said layer with a light-sensitive diazo resin, the weight ratio of said vinyl polymer to said diazo resin being from about 8:1 to about 20:1.

3. A stable presensitized positively-acting dimensionally-stable planographic plate capable, upon a single exposure through a positive transparency followed by a simple washing step, of directly providing insoluble hydrophilic surface areas which permanently define or outline the image areas corresponding to the opaque areas of said transparency, said plate comprising an aluminum sheet having a water-insoluble hydrophilic isolating and bonding surface layer formed by reacting an aqueous solution of a soluble silicate with the surface of said sheet, said layer overlying and being firmly bonded to said sheet and being substantially free of water-soluble material and a soluble sensitizer layer overlying and adhered to said isolating and bonding layer, said sensitizer layer being characterized in that, upon exposure to light through a transparency, it reacts in the exposed areas to provide an insoluble ink-repellent water-receptive surface corresponding with the light-transmissive areas of said transparency while remaining soluble and readily removable in the unexposed areas corresponding with the opaque areas of said transparency, said sensitizer layer comprising water-soluble polyacrylamide intimately mixed throughout said layer with a light-sensitive diazo resin, the weight ratio of polyacrylamide to said diazo resin being from about 8:1 to about 300:1.

4. A positively-acting dimensionally stable photo-sensitive plate comprising a metal base sheet having a water-insoluble hydrophilic isolating and bonding surface treatment, having an organophilic surface comprising the water-insoluble light decomposition product of a diazo resin overlying and firmly bonded to said isolating and bonding surface treatment, and having a layer thereon of water-soluble organic hydrophilic acrylic polymer containing a soluble light-sensitive diazo resin in the weight ratio of acrylic polymer to diazo resin of between 8:1 to 20:1.

5. A positively-acting dimensionally stable photo-sensitive plate comprising a metal base sheet having a water-insoluble hydrophilic isolating and bonding surface treatment, having an organophilic surface comprising the water-insoluble light decomposition product of a diazo resin overlying and firmly bonded to said isolating and bonding surface treatment, and having a layer thereon of water-soluble polyacrylamide containing in uniform admixture therewith a water-soluble light-sensitive diazo resin in the weight ratio of polyacrylamide to diazo resin of from about 8:1 to about 300:1.

6. A positively-acting dimensionally stable photo-sensitive plate comprising a metal base sheet having a water-insoluble hydrophilic isolating and bonding surface treatment, having an organophilic surface comprising the water-insoluble light decomposition product of a diazo resin overlying and firmly bonded to said isolating and bonding surface treatment, and having a layer thereon of water-soluble film-forming copolymer of polyvinyl methyl ether and maleic anhydride containing in uniform admixture therewith a water-soluble light-sensitive diazo resin in the weight ratio of said copolymer to diazo resin of from about 8:1 to about 20:1.

7. A positively-acting dimensionally stable photo-sensitive plate comprising a metal base sheet having a water insoluble hydrophilic isolating and bonding surface treatment characterized in that it will cause an in situ insolubilized diazo resin strongly to adhere to surface of said sheet, and having a layer thereon of water-soluble organic hydrophilic acrylic polymer containing a soluble light-sensitive diazo resin in the ratio of acrylic polymer to diazo resin of between 8:1 and 20:1.

References Cited in the file of this patent

UNITED STATES PATENTS

| | | |
|---|---|---|
| 711,101 | Foerster | Oct. 14, 1902 |
| 1,325,890 | Freuder | Dec. 23, 1919 |
| 2,100,063 | Zahn | Nov. 23, 1937 |
| 2,507,314 | Mason | May 9, 1950 |
| 2,667,415 | Neugebauer et al. | Jan. 26, 1954 |
| 2,687,958 | Neugebauer et al. | Aug. 31, 1954 |
| 2,702,243 | Schmidt | Feb. 15, 1955 |
| 2,714,066 | Jewett et al. | July 26, 1955 |
| 2,729,562 | Zemp | Jan. 3, 1956 |
| 2,804,388 | Marron et al. | Aug. 27, 1957 |
| 2,937,085 | Seven et al. | May 17, 1960 |

FOREIGN PATENTS

| | | |
|---|---|---|
| 407,830 | Great Britain | Mar. 29, 1934 |